United States Patent

Beer et al.

Patent Number: 6,016,146
Date of Patent: Jan. 18, 2000

[54] METHOD AND APPARATUS FOR ENHANCING TEMPLATE CREATION AND MANIPULATION IN A GRAPHICAL USER INTERFACE

[75] Inventors: John Carl Beer, Austin, Tex.; Mark Tweed Bowman, Boca Raton, Fla.; Georgia Ann Gibson, Georgetown, Tex.; John Lovgren, Austin, Tex.; Marianne Poythress Radding, Georgetown, Tex.; Julieta Kaoru Yamakawa, Austin, Tex.

[73] Assignee: International Business Machines Corproation, Armonk, N.Y.

[21] Appl. No.: 08/280,907

[22] Filed: Jul. 27, 1994

[51] Int. Cl.⁷ .................................................. G06F 3/14
[52] U.S. Cl. ............................................... 345/349
[58] Field of Search ................... 395/155–161; 345/349, 333, 348, 351, 347, 346, 339

[56] References Cited

U.S. PATENT DOCUMENTS

| | | | |
|---|---|---|---|
| 5,140,677 | 8/1992 | Fleming et al. | 345/348 |
| 5,384,911 | 1/1995 | Bloomfield | 345/333 |
| 5,392,389 | 2/1995 | Fleming | 345/349 |
| 5,416,901 | 5/1995 | Torres | 345/348 |
| 5,422,993 | 6/1995 | Fleming | 345/348 |
| 5,428,734 | 6/1995 | Haynes et al. | 345/349 |
| 5,461,710 | 10/1995 | Bloomfield et al. | 345/349 |

OTHER PUBLICATIONS

"Method for Providing a Readily Distinguishable Template and Means of Duplication Thereof in a Computer System Graphical User Interface", Application Serial No. 07/855,366, filed Mar. 20, 1992, IBM Docket BC9–92–047 to M. A. Bloomfield et al., now U.S. patent No. 5,461,710.

*Primary Examiner*—Crescelle N. dela Torre
*Attorney, Agent, or Firm*—Diana L. Roberts

[57] ABSTRACT

A method and apparatus for enhancing template manipulation and creation in a graphical user interface. The user can create numerous additional templates from an existing object, template, or "generic" template. The method includes the computer-implemented steps of positioning a copy of at least one object into a template area pane and creating at least one template in the template area pane from that copied object. The apparatus includes a processor, a display device, pointing device, a template area pane displayed on the display device, at least one object which is positioned into the template area pane. The template area pane creates at least one template from the object and displays that template in the template area pane.

20 Claims, 7 Drawing Sheets

METHOD AND APPARATUS FOR ENHANCING TEMPLATE CREATION AND MANIPULATION IN A GRAPHICAL USER INTERFACE

BACKGROUND OF THE INVENTION

1. Field of the Invention

The present invention relates to computer systems and, more particularly, to a method and apparatus for enhancing template manipulation and creation in a graphical user interface (GUI).

2. Background Information and Description of Related Art

Manufacturers, including IBM, have developed various types of GUI systems. These GUI systems reside in, for example, IBM's OS/2™, Apple's Macintosh System™, and Microsoft's Windows™ for IBM compatible machines. A user typically controls these GUI systems using a pointing device, such as a mouse. In turn, the mouse controls a software pointer (e.g. mouse cursor) that appears on a display of the computer system. The mouse cursor is used to manipulate various elements on the display, such as objects and templates.

An object is a software component of the GUI and can be manipulated as a single unit to perform a task. The object contains collections of procedures and data and can be grouped into classes. All objects of the same class are identical in form and behavior, but have different data associated therewith. The object may appear as text, an icon, or both on the display. Examples of the properties exhibited by a document object are its name, icon, font, selected printer, the particular application with which it is associated, and its text contents.

A conventional template is a specific type of object that is used to create instances of an object class, such as, for example, a storage device object, a printer object, or a user group object. In conventional template creation, the user must first create an instance of the object, then perform multiple steps to transform the object instance into a template. Because these steps are typically listed in a menu, the steps are not obvious to the user. Moreover, the user must first know that it is even possible to change an object into a template before searching for the specific steps in the GUI. Therefore, conventional template creation places an undue cognitive burden on the user and makes the GUI difficult to learn and use.

Accordingly, there is a great need for an enhanced GUI which simplifies the creation and duplication of objects and templates.

SUMMARY OF THE INVENTION

The present invention is a method and apparatus for enhancing template manipulation. In one embodiment, the method includes the steps of displaying a template area pane on a display, positioning a copy of at least one object into the template area pane, and creating a template from the copied object in the template pane.

In a second embodiment, the method includes the step of displaying a work area pane on a display, wherein the work area pane has at least one object positioned therein. The method also includes the steps of placing a copy of at least one template onto the object, creating an instance of the template, and storing that instance in the object.

The apparatus includes a processor, a display device, a pointing device, and means for controlling the processor to display a template area pane on the display device. The pointing device is used to position a copy of at least one object into the template area pane. The apparatus also includes means for controlling the processor to create a template in the template area pane from the copied object.

DETAILED DESCRIPTION OF THE PREFERRED EMBODIMENT

The following detailed description is of the best presently contemplated mode for carrying out the invention. This description is not to be viewed in a limiting sense, but is made merely for the purpose of illustrating the general principles of the invention, the scope of which is only defined by the appended claims.

Figure 1:
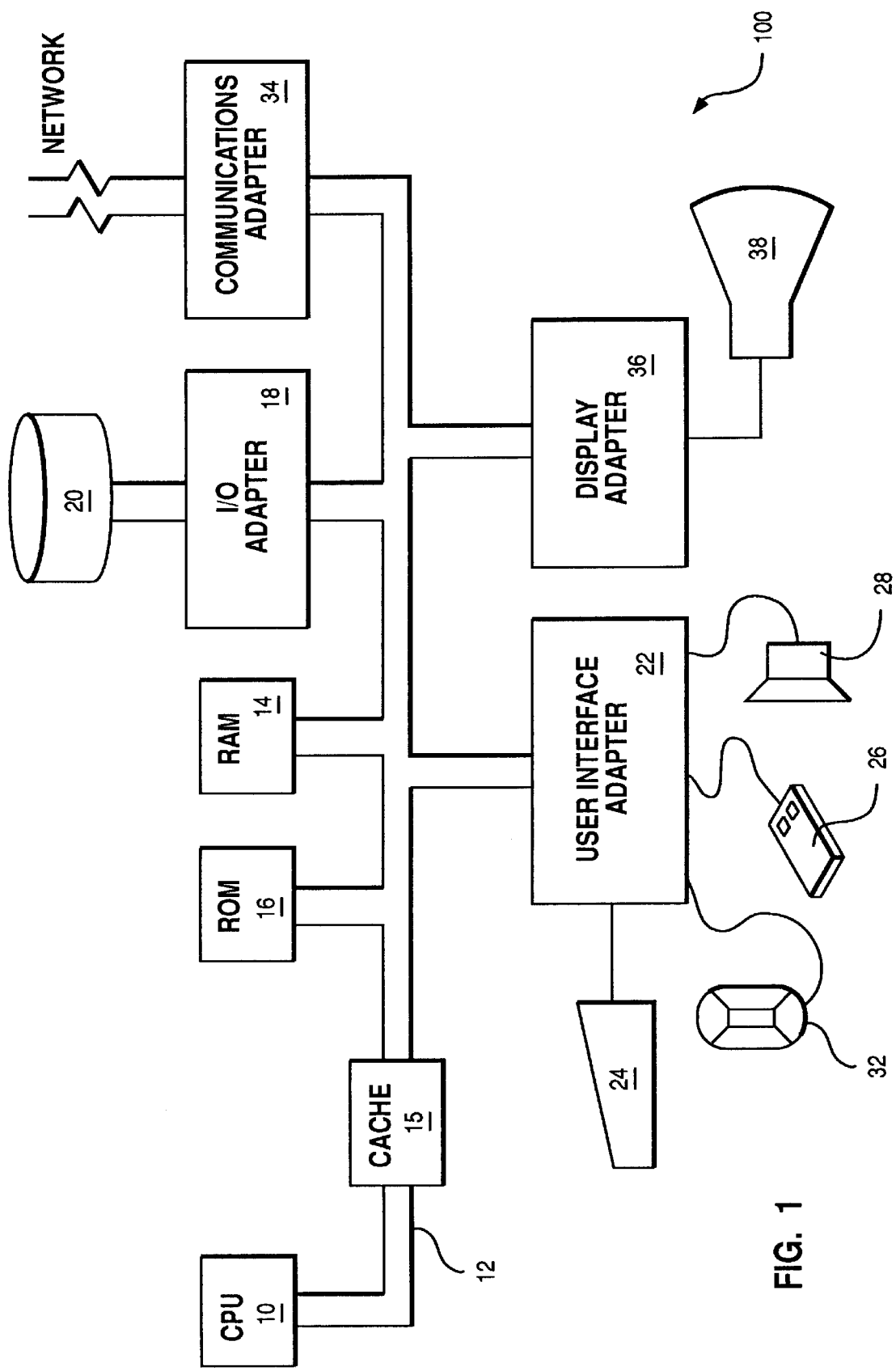
FIG. 1 is a schematic diagram of hardware for use with the present invention.

The preferred embodiment is preferably practiced in any suitable hardware configuration, such as a laptop computer. However, FIG. 1 illustrates another suitable hardware configuration. Workstation 100 includes any suitable central processing unit 10, such as a conventional microprocessor, and a number of other units interconnected via system bus 12. Illustratively, workstation 100 includes random access memory (RAM) 14, cache 15, read only memory (ROM) 16, display adapter 36 for connecting system bus 12 to display device 38, and I/O adapter 18 for connecting peripheral devices (e.g. disk and tape drives 20) to system bus 12.

Workstation 100 further includes user interface adapter 22 for connecting keyboard 24, mouse 26, speaker 28, microphone 32, and/or other user interface devices, such as a touch screen device (not shown), to system bus 12. Communication adapter 34 connects workstation 100 to a data processing network. Any suitable operating system may direct the operation of workstation 100. However, in the preferred embodiment, the AIX™ operating system controls workstation 100.

The preferred embodiment includes a GUI which resides within a machine-readable media to direct the operation of workstation 100. Any suitable machine-readable media may retain the GUI, such as RAM 14, ROM 16, a magnetic diskette, magnetic tape, CD-ROM, or optical disk (the last four being located in disk and tape drives 20). The GUI controls and directs CPU 10 to create an object from a template, a template from an existing template, and a terplate from an existing object. For ease of explanation, the following specification describes the GUI as performing those tasks. In actuality, the GUI merely controls and directs CPU 10 to perform those tasks.

Figure 2:
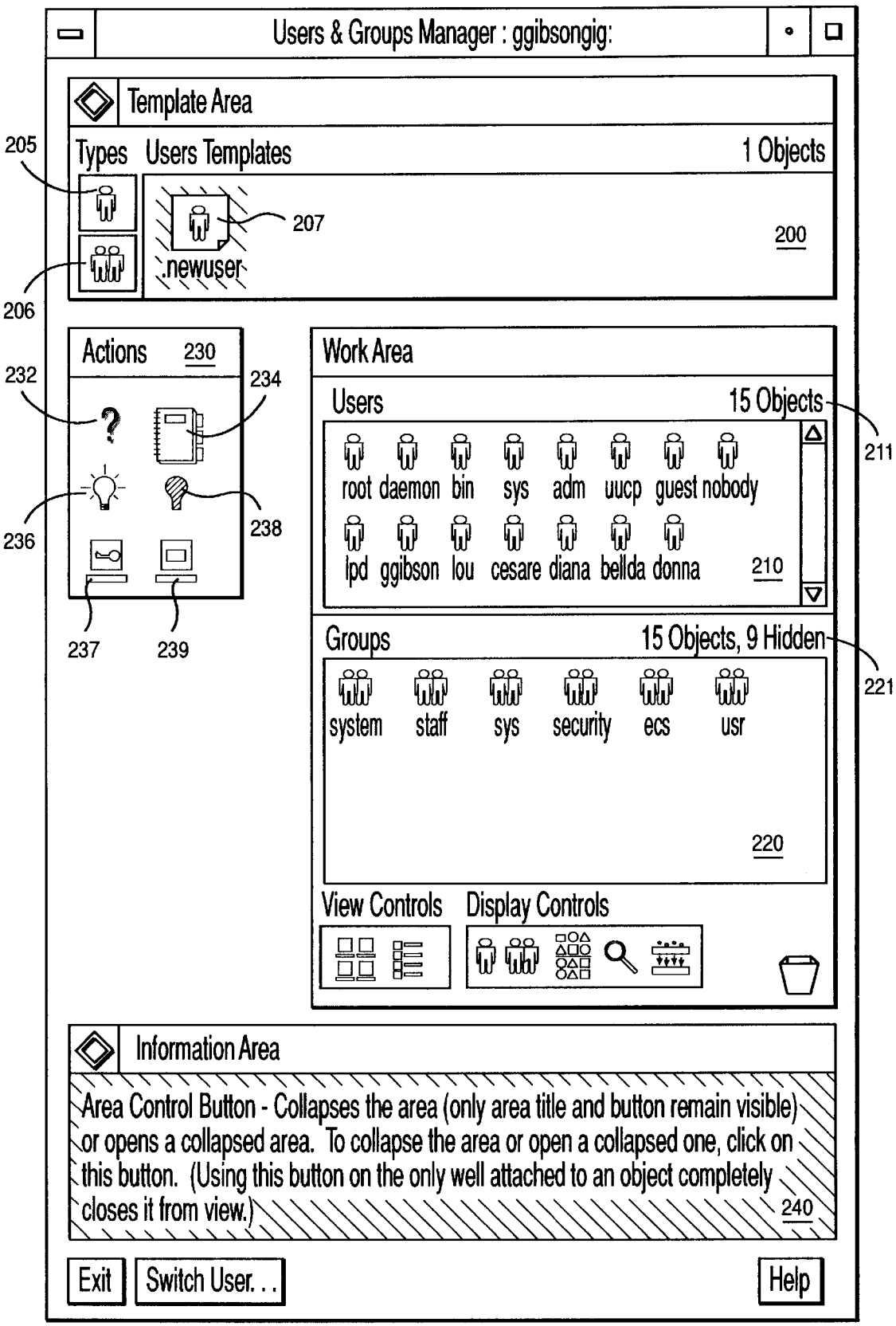
FIG. 2 is a pictorial view of a front-of-screen user interface according to the present invention.

FIG. 2 is a pictorial view of a window on a display screen that was created by the GUI. For purposes of illustration, this window displays objects, represented as icons, that define various users and groups of users. However, it should be understood that any class of object, such as printers or storage units, could have been used.

Action objects in action object pane 230 perform various actions on any selected icon from user work area pane 210, group work area pane 220, or template area pane 200. The action objects in action object pane 230 include contextual help icon 232, "show properties" icon 234, enable icon 236, disable icon 238, set password icon 237, and change initial interface icon 238. The user interacts contextual help icon 232 and "show properties" icon 234 with any selected object from user work area pane 210, group work area pane 220, or template area pane 200 in one of two methods.

It is important to note that the user also interacts any selected object icon from user work area pane 210 and group work area pane 220 with template area pane 200 and, vice versa, using the following methods:

In the first method, the user positions the mouse cursor (i.e. pointer) on a desired object icon and clicks the left mouse button to select it. To select multiple objects, the user positions the mouse cursor to the left of one object and depresses the left mouse button. The user then moves the mouse cursor over the desired object(s) and releases the mouse button when the last object has been selected. Alternatively, the user can select multiple objects by continuing to press the keyboard shift key while selecting objects with the left mouse button until all desired objects have been selected.

At this point, the user has selected all desired objects. Next, the user positions the mouse cursor on the action icon and clicks the mouse button to display a dialog on the screen to complete the action. Alternatively, the action could be completed automatically without displaying the dialog.

In the second method, the user drags the action icon over the object icon and drops it on the desired object icon to display a dialog. Selecting, dragging and dropping icons on a display screen using a mouse cursor (i.e. pointer) is commonly known in the art and need not be further discussed.

In this example, change initial interface icon 239 displays a dialog (not shown) which allows the user to set the interface that is displayed when a particular user logs on, such as a command line interface or desktop interface. When activated, enable icon 236 and disable icon 238 each provide a dialog which allows a system administrator to enable or disable, respectively, users from the system. Set password icon 237 allows the user to set or change the password for any selected object. Contextual help icon 232 provides the user with more detailed information about a selected object such as, for example, all possible tasks associated with the object.

"Show properties" icon 234 enables the user to display and change the actual attributes of the object. For example, for a user object, the user may change the object name, user I.D., primary group, group set, home directory, initial program, and user information. For a group template object, the user may change the template name, group I.D., members of the group, whether the group is an administrative group, and the list of group administrators.

Information area pane 240 provides a brief definition of any selected object or screen area, how the user interacts with that object or screen area, and the possible states of the object. The user can point to task objects, task actions, screen areas, and screen objects that are under the cursor (i.e. the target).

The GUI displays individual user icons in work area pane 210. Work area pane 210 is a bordered panel which retains only user object icons. As such, the GUI will not display other types of objects within this pane. Object counter 211 displays the number of user icons in user work area pane 210.

The GUI also displays user group icons in group work area pane 220. Group work area pane 220 is a bordered panel which retains only user group icons. As such, the GUI will not display other types of objects within this pane. Object counter 221 displays the number of user group icons located in the group work area pane 220. In this example, it also displays the number of objects hidden from the user's view. The user can observe any of these objects by opening the object to view its contents.

Moreover, the GUI displays all template icons in a template area. The template area includes template area pane 200 and template area pane 201. Template area pane 200 is a bordered panel which retains only template icons. Template area pane 201 retains "generic" templates that are automatically provided by the GUI, such as "generic" templates 205 and 206. The number of "generic" templates provided by the GUI depends on the number of object types supported by the operating system. For example, if the operating system supports ten types of printers, then ten different "generic" templates could be provided by the GUI, one for each printer.

The GUI allows the user to open any object by positioning the mouse cursor over the object and double clicking the mouse button. In response, the GUI generates the same dialog that is displayed when "show properties" icon 234 is dropped on the object.

Figure 3:
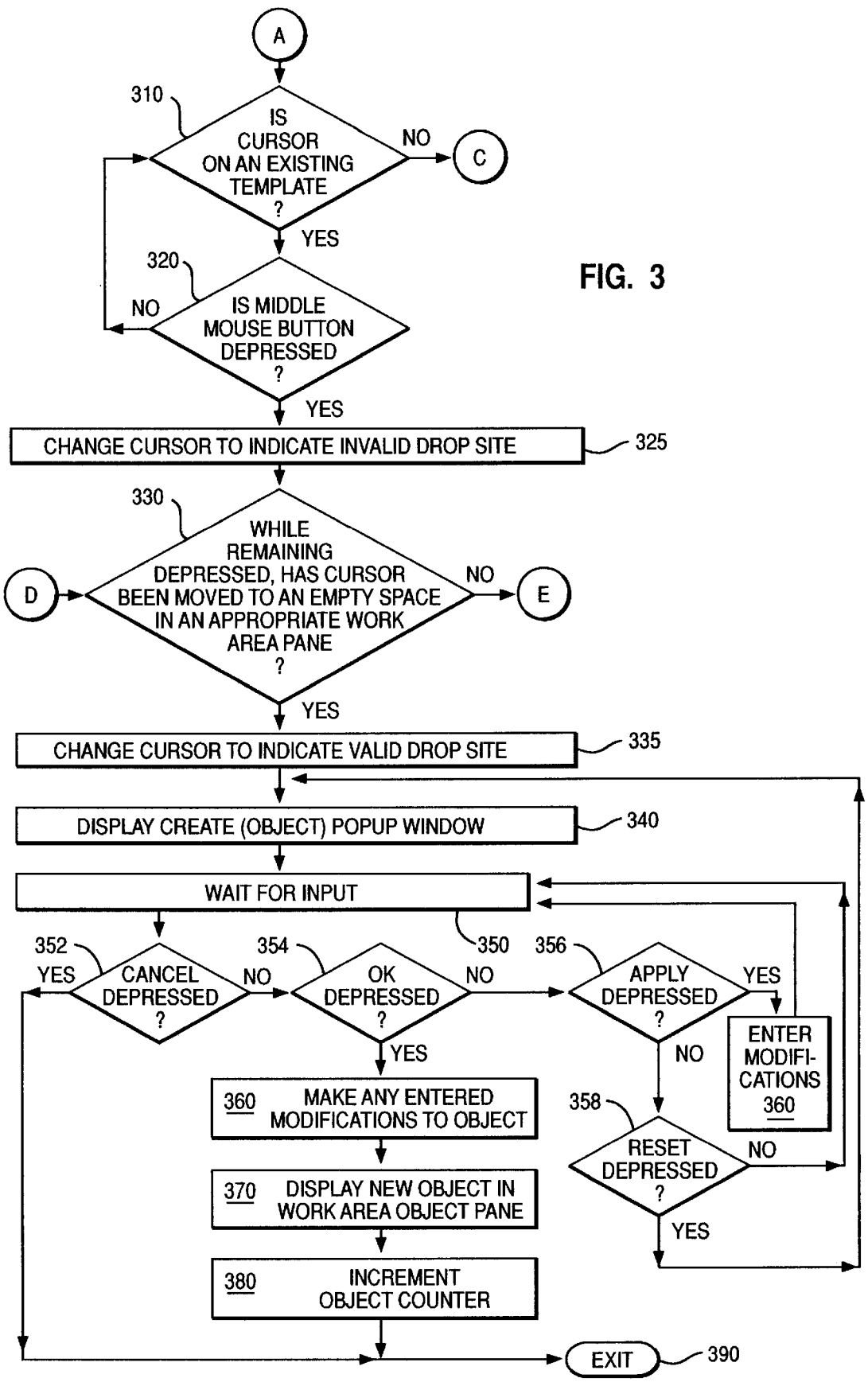
FIG. 3 is a flowchart illustrating a technique for creating an object from a template according to the present invention.

FIG. 3 is a flowchart of detailed logic for creating an object (e.g. instance) from an existing template in template area pane 200. However, it should be understood that, using the same steps, a copy of multiple templates may be concurrently dragged and dropped on an empty space or object within a valid work area pane to produce an instance for each of those copied templates.

Referring to FIGS. 2 and 3, at 310, the GUI determines if the mouse cursor is on an existing template icon, such as template icon 207. If not, control is directed to flowchart C (see FIG. 5, described herein). If so, at 320, the GUI determines if the middle mouse button is depressed. If not depressed, control is directed to 310.

If depressed, at 325, the GUI changes the mouse cursor to indicate an invalid drop site. Specifically, the GUI displays a shadowed image of the object within the template backdrop, overlayed with a dashed-circle icon to indicate an invalid drop site (not shown). Alternately, the mouse cursor could change to a variety of different shapes to indicate an invalid drop site.

Every object, including templates, has a category that defines the characteristics of that object. Those characteristics are stored in a database within the GUI and include, for example, valid actions for the object, valid drop sites for the object, and valid icons for the object. As such, while the middle mouse button continues to remain depressed, at 325, the GUI searches the database for the selected template's category and dynamically examines the valid drop sites for that template.

Next, the user may drag the template across the display screen using the mouse cursor. At 325, the GUI dynamically determines if the user has dragged the template icon over an empty space or existing object within an appropriate work area pane, such as user work area pane 210 or group work area pane 220. To do so, the GUI examines both the position of the mouse cursor on the screen and the information stored in the template's category concerning valid drop sites. As such, the GUI determines if the user has dragged the template from template area pane 200 to a valid empty space or object within a work area pane.

Figure 4:
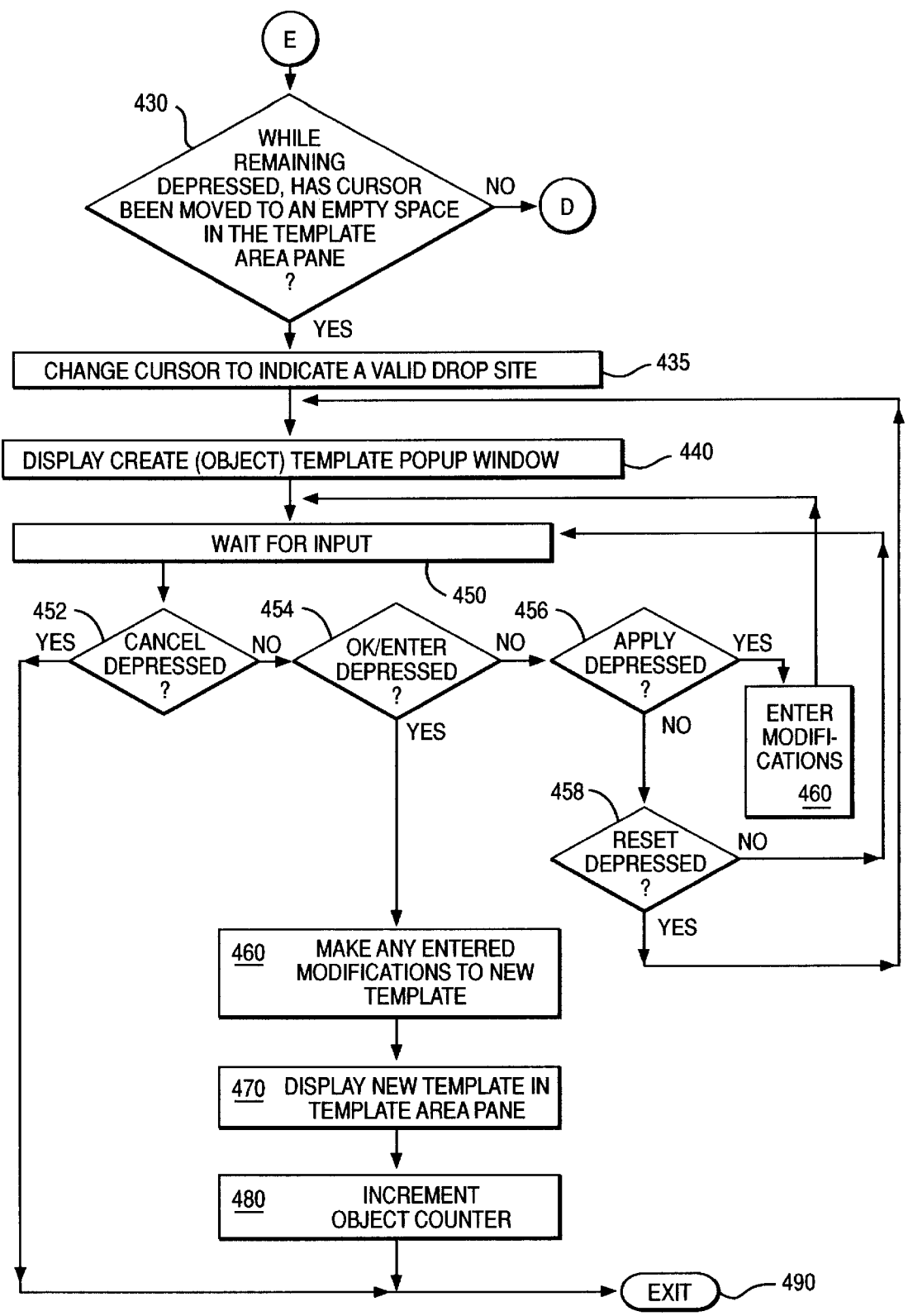
FIG. 4 is a flowchart illustrating a technique for creating a template from an existing template according to the present invention.

If not over a valid empty space or existing object within a work area, the GUI continues to display the mouse cursor that indicates an invalid drop site and directs control to the detailed logic in flowchart E (see FIG. 4, described herein). All objects remain in their original state. For example, if the user attempted to drag template icon 207 into action object pane 230, control would be directed to flowchart E.

Figure 6:
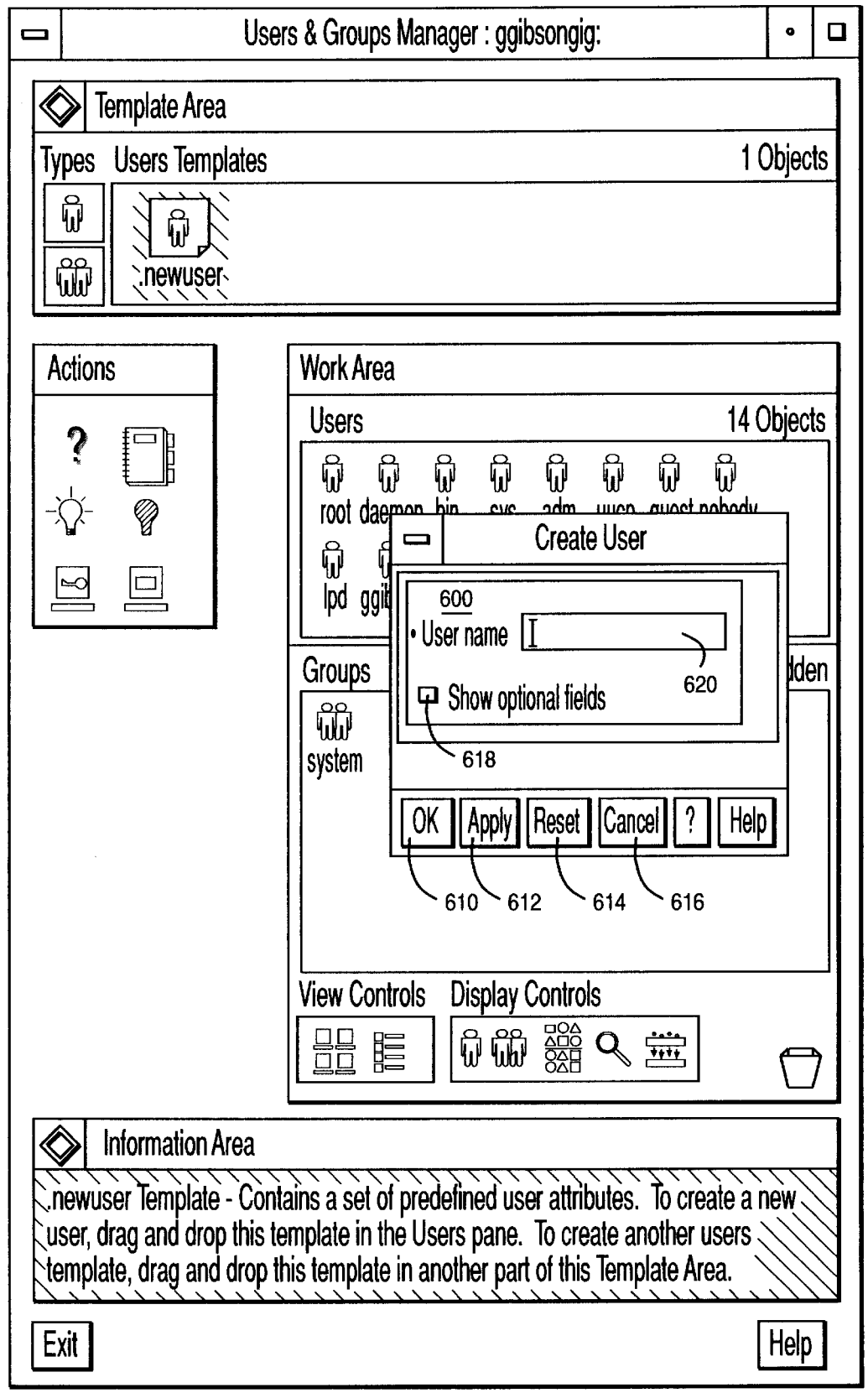
FIG. 6 is a pictorial view of a front-of-screen user interface illustrating a create user pop-up window according to the present invention.

If template icon 207 was dragged into an appropriate or valid work area pane at 335, the GUI changes the cursor to a solid black image of the object within the backdrop of the template icon. Once the template is dropped (i.e., mouse button released), at 340, the GUI displays create <object> pop-up window 600, which is illustrated in FIG. 6. At 350, the GUI waits for input from the user.

Referring to FIGS. 3 and 6, the new object has the same name, class, data, and properties of the template that was dragged and dropped. However, pop-up window 600 allows the user to rename the newly created object in the user name field 620 and to view any of the contents and properties of that newly created object by positioning and activating the cursor over "Show optional fields" 618.

When the user has completed modifications, if any, to the newly created object, he/she presses either OK button 610, apply button 612, reset button 614, cancel button 616, or the enter key on the keyboard. At 352, if cancel button 616 was depressed, the GUI directs control to exit 390 and does not create a new object. At 354, if either OK button 610 or the enter key of the keyboard (see FIG. 1) was depressed, control passes to 360. At 356, if apply button 612 was depressed, the GUI stores any modifications in a database that resides in the GUI for that object and returns controls to 350 for further modification. At 358, if reset button 614 was depressed, the GUI returns control to 340 and displays the original state of window 600. Otherwise, control returns to 350.

At 360, any changes made to the newly created object are stored in the database in the GUI. Next, at 370, the GUI displays the new object in the work area object pane. If the template was dropped on an existing object, the GUI displays the new object in the work area pane that contains the existing object. Further, at 380, the GUI increments the object counter, which displays the number of objects in the particular work area object pane.

Any work object or template object, including existing user icons and existing template icons, may be dragged and dropped into template area pane 200 (see FIG. 2) to create a new template. Once an object is dropped within template area pane 200, the GUI automatically transforms that object into a template having the same characteristics and name as the dropped object.

FIG. 4 is an extension to flowchart A of FIG. 3 and includes detailed logic for creating a new template from an existing template. However, it should be understood that, using the same steps, a copy of multiple templates may be concurrently dragged and dropped within a valid template area pane to produce another template from each of those copied templates.

From flowchart A, the GUI has determined that the mouse cursor is on an existing template within template area pane 200 and that the middle mouse button is depressed. At 430, the GUI determines if the mouse cursor is positioned on an empty space within template area pane 200.

If not properly positioned on an empty space within template area pane 200, control returns to D of FIG. 3 (previously described) and the GUI maintains the invalid drop site cursor shape. For example, if the user drags template icon 207 across another existing template within template area pane 200, the cursor maintains the dashed circle shape to indicate an invalid drop site.

If the template has been dragged into an empty space within template area pane 200, at 435, the GUI changes the cursor to the shape of the dragged template, but having a backdrop unique to template area pane 200. Once the template has been dropped into template area pane 200, the GUI displays create <object> template pop-up window 700, which is illustrated in FIG. 7.

Figure 7:
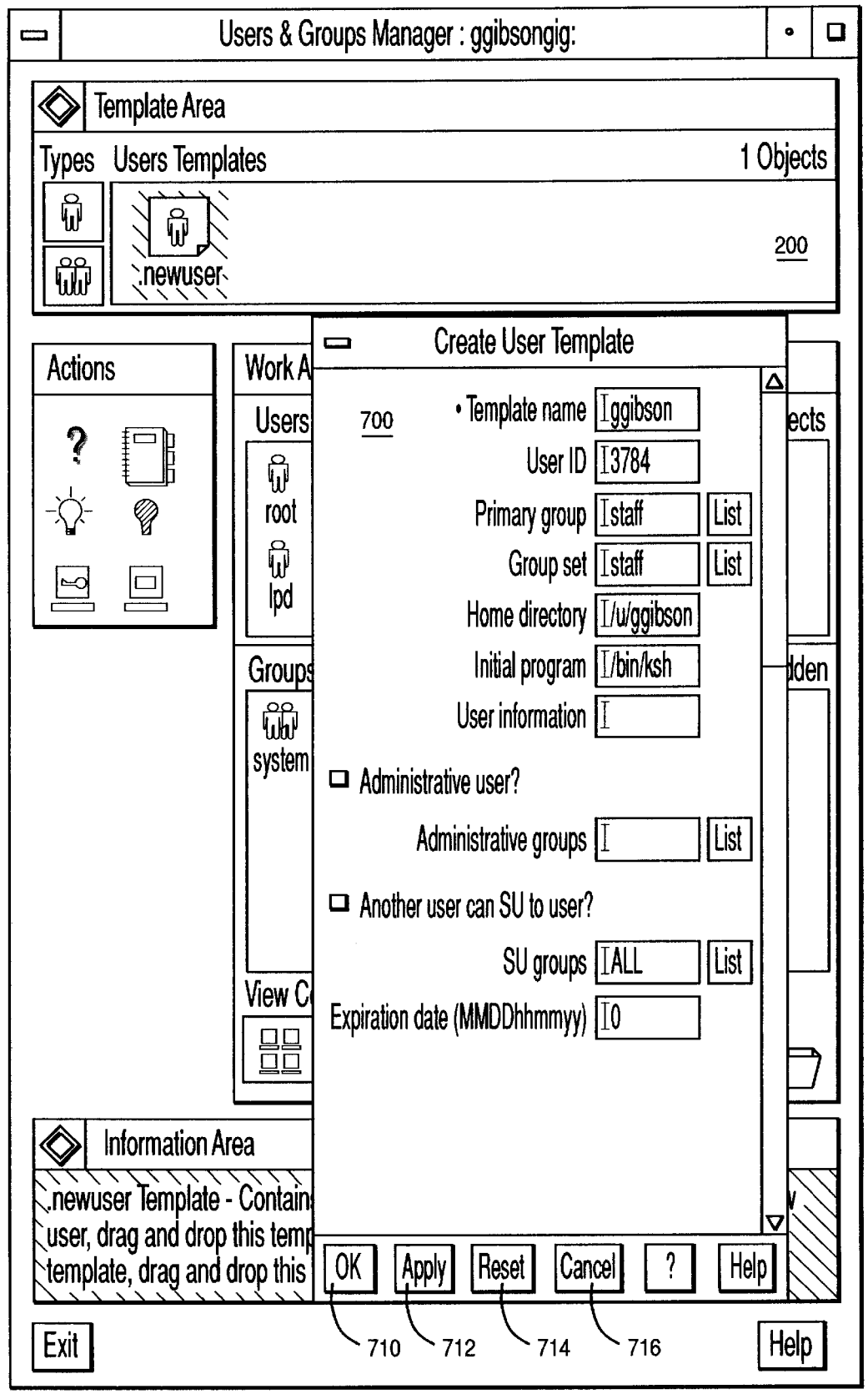
FIG. 7 is a pictorial view of a front-of-screen user interface illustrating a create user template pop-up window according to the present invention.

Referring to FIGS. 4 and 7, window 700 allows the user to rename the newly created template and change the contents and properties of that newly created template, if desired, because the new template has the same name, class, data, and properties as the template that was dragged and dropped.

At 450, the GUI waits for input from the user. At 452, if cancel button 716 has been depressed, the GUI directs control to exit 490 and does not create a template. At 454, if either OK button 710 or the enter key of the keyboard (see FIG. 1) has been depressed, control passes to 460. At 456, if apply button 612 has been depressed, the GUI stores any modifications in a database that resides in the GUI at 460 and returns control to 450 for further modification. At 458, if reset button 714 has been depressed, the GUI returns control to 440 and displays the original state of window 700. Otherwise, control returns to 450.

At 460, the GUI stores any user modifications to the newly created template in the database in the GUI. Next, at 470, the GUI displays the new template in template area pane 200. Further, at 480, the GUI increments the template counter, which displays the number of templates in template area pane 200.

Figure 5:
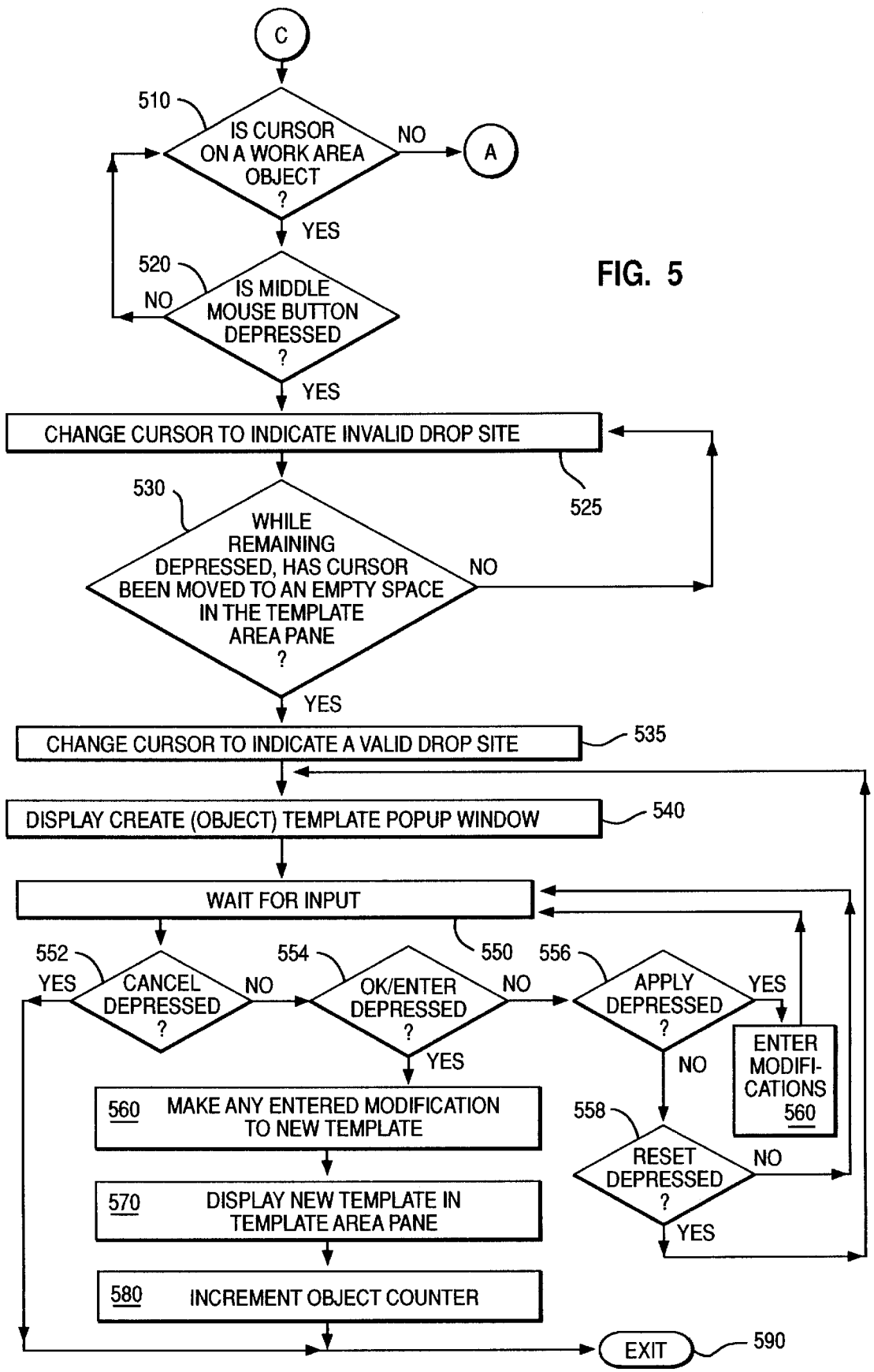
FIG. 5 is a flowchart illustrating a technique for creating a template from an existing object according to the present invention.

FIG. 5 is a flowchart illustrating detailed logic for creating a template from an existing object. However, it should be understood that, using the same steps, a copy of multiple objects may be concurrently dragged and dropped within a valid template area pane to produce a template from each of those copied objects.

At 510, the GUI determines if the mouse cursor is on an existing object within an appropriate work area pane (e.g. user work area 210 or group work area 220). If not, control returns to flowchart A (see FIG. 3). If so, at 520, the GUI determines if the middle mouse button is depressed. If not depressed, control returns to 510. If depressed, at 525, the GUI changes the cursor to indicate an improper drop site to the user. In the preferred embodiment, the cursor is a dark shadow of the object on top of the shadowed object.

At 530, the GUI then determines if the mouse cursor is positioned in an appropriate template area pane while the middle mouse button continues to be depressed. That is, the GUI determines if the user has dragged the object from the work area pane into template area pane 200. To do so, the GUI examines the position of the cursor on the screen and the information stored in the object's category concerning valid drop sites. As such, the GUI determines if the user has dragged the object from the work area pane into an appropriate or valid template area pane.

If not in an appropriate or valid template area pane, control returns to 525 and the GUI maintains the invalid drop site cursor to indicate an improper drop site to the user.

If the object was dragged and dropped into another improper work area pane, the GUI returns the shadowed icon to its original visual state and position. A "rubberband" effect causes dark lines to connect the shadowed object to the original icon and draw it quickly back to its origin.

If the object has been dragged into template area pane 200, at 535, the GUI changes the mouse cursor into a shadowed shape of the object. Once the object has been dropped (i.e., mouse button released), at 540, the GUI displays a create <object> template pop-up window 700, as illustrated in FIG. 7. Pop-up window 700 allows the user to rename the newly created template and change the contents and properties of that newly created template, if desired, because the new template has the same name, class, data, and properties as the object that was dragged and dropped. Therefore, the dragging and dropping of the object into template area pane 200 created a new template of the same class as the object.

At 550, the GUI waits for input from the user. At 552, if cancel button 716 has been depressed, the GUI directs control to exit 590 and does not create the template. At 554, if either OK button 710 or the enter key of the keyboard (see FIG. 1) has been depressed, control passes to 560. At 556, if apply button 712 has been depressed, the GUI stores any modifications in a database that resides in the GUI at 558 and returns control to 550 for further modification. At 558, if reset button 714 has been depressed, the GUI clears input areas and returns control to 540 to display the original state of window 700. Otherwise, control returns to 550.

At 560, any user modifications to the newly created template are stored in the GUI. Next, at 570, the GUI displays the new template in template area pane 200. Further, at 580, the GUI increments the object counter, which represents the number of templates in template area pane 200.

The following code illustrates the above description:

```
While cursor is on an existing template and middle
   mouse button is depressed;
{
   Change cursor shape to indicate an improper
      drop site;
   Search for the template's category in a
      database;
   Monitor location of cursor;
   {
      If cursor moves to an empty space or valid
         existing object in a valid work area
         pane
      {
         change cursor to reflect appropriate
            work area pane drop site;
         in response to the template being
            dropped in the work area pane,
            retrieve attributes of the
            dropped template from the
            database and display in a
            display window;
         wait for input;
         make modifications, if any, to those
            attributes and store in database
            for a newly created object;
         display newly created object in the
            work area pane;
         increment object counter;
      }
      If cursor moves to an empty space in a
         valid template area pane;
      {
         change cursor to reflect appropriate
            template area pane drop site;
         in response to the template being
            dropped in the template area
            pane, retrieve attributes of the
            dropped template from the
            database and display in a
            display window;
         wait for input;
         make modifications, if any, to those
            attributes and store in database
            for a newly created template;
         display the newly created template in
            the template area pane;
         increment object counter;
      }
      Else maintain cursor shape to indicate an
         improper drop site;
   }
}
While cursor is on an existing object and middle
   button is depressed;
{
   Change cursor shape to indicate improper drop
      site;
   Search for the object's category in a database;
   Monitor the location of cursor;
   {
      If cursor is on an empty space in a valid
         template area pane
      {
         change cursor shape to reflect
            appropriate template area pane
            drop site;
         in response to the object being
            dropped in the template area
            pane, retrieve attributes of the
            dropped object from the database
            and display in a display window;
         wait for input;
         make modifications, if any, to those
            attributes and store in database
            for a newly created template;
         display the newly created template in
            the template area pane;
         increment object counter;
      }
      Else maintain cursor shape to indicate
         improper drop site;
   }
}
```

While the invention has been shown and described with reference to particular embodiments thereof, it will be understood by those skilled in the art that the foregoing and other changes in form and detail may be made therein without departing from the spirit and scope of the invention.

We claim:

1. A method for controlling a computer system, having at least a display, user controls, and processor, to enhance template object manipulation and creation, comprising the computer-implemented steps of:

displaying a template area pane on said display, wherein said template area pane displays only template objects and creates template objects from any object copied into said template area pane; and in response to copying at least one template object of a specific object class from said template area pane into an empty space within said template area pane, said specific object class having attributes, automatically creating at least one new template object in said template area pane from said at least one template object, wherein said new template object has the attributes of the specific object class.

2. The method according to claim 1 further comprising the step of:

determining if said at least one object has been positioned over an improper drop site.

3. The method according to claim 2 wherein said determining step comprises the following steps:

searching a database to determine valid drop sites for said at least one object;

determining the position of said at least one object on said display; and comparing said position with said valid drop sites to determine if said position is valid.

4. The method of claim 3 wherein said step of determining the position of said at least one object comprises the steps of:

marking said at least one object with a pointer on said display; and tracing said pointer on said display.

5. The method according to claim 4 further comprising the step of:

in response to said at least one object being positioned over said improper drop site, changing said pointer to indicate placement over said improper drop site.

6. The method of claim 1 wherein said automatically creating step comprises the following steps:

searching a database to determine attributes of said at least one object; and storing said attributes in said database for said at least one template.

7. The method according to claim 1 further comprising the step of concurrently displaying said at least one template area pane and a work area pane on said display.

8. The method according to claim 7 wherein said positioning step comprises the steps of copying said at least one object from said work area pane and dropping said copied at least one object into an empty space within said template area pane.

9. The method according to claim 7 wherein said step of concurrently displaying said template area pane and said work area pane comprises the steps of:

forming a first bordered panel on said display to create said template area pane, said template area pane for displaying only templates; and concurrently forming a second bordered panel on said display to create said work area pane, said work area pane for displaying only non-template objects.

10. The method according to claim 9 further comprising the step of concurrently displaying said template area pane, said work area pane, and an action area pane on said display, said action area pane for displaying only action objects.

11. An apparatus for enhancing template manipulation and creation in a graphical user interface, comprising:

a processor;

user controls;

a display device;

means for controlling said processor to display a template area pane on said display device, wherein said template area pane displays only template objects and creates template objects from any object copied into said template area pane;

said user controls for copying at least one template object from said template area pane into an empty space in said template area pane; and in response to copying the at least one template object of a specific object class into said template area pane, said specific object class having attributes, means for controlling said processor to automatically create and display at least one new template object from said at least one template object in said template area pane, wherein said new template object has the attributes of the specific object class.

12. The apparatus according to claim 11 further comprising:

means for determining if said at least one object has been positioned over an improper drop site.

13. The apparatus according to claim 12 wherein said means for determining comprises:

means for searching a database to determine valid drop sites for said at least one object;

means for determining the position of said at least one object on said display; and means for comparing said position with said valid drop sites to determine if said position is valid.

14. The apparatus according claim 13 wherein said means for determining the position of said at least one object comprises:

means for marking said at least one object on said display device using said pointing device; and means for tracing said at least one object on said display.

15. The apparatus according to claim 14 further comprising:

in response to said at least one object being positioned over said improper drop site, means for changing said pointer to indicate positioning over said improper drop site.

16. The apparatus according to claim 11 wherein said means for automatically creating comprises:

means for searching a database to determine attributes of said at least one object; and means for storing said attributes in said database for said at least one template.

17. The apparatus according to claim 11 further comprising means for concurrently displaying said template area pane and a work area pane on said display.

18. The apparatus according to claim 17 wherein said positioning means comprises means for copying said at least one object from said work area pane and means for dropping said copied at least one object into an empty space within said template area pane.

19. The apparatus according to claim 17 wherein said means for concurrently displaying said template area pane and said work area pane comprises:

means for forming a first bordered panel on said display to create said template area pane, said template area pane for displaying only templates; and means for concurrently forming a second bordered panel on said display to create said work area pane, said work area pane for displaying only non-template objects.

20. The apparatus according to claim 19 further comprising means for concurrently displaying said template area pane, said work area pane, and an action area pane on said display, said action area pane for displaying only action objects.

* * * * *